E. CAVERLY.
MEANS FOR CARRYING OUT BUSINESS SYSTEMS.
APPLICATION FILED JAN. 25, 1908.

1,056,500.

Patented Mar. 18, 1913.

2 SHEETS—SHEET 1.

FIG. 1

WITNESSES:
John Waldheim.
E. M. Wells.

INVENTOR:
Edward Caverly
by Robert H. Strother
HIS ATTORNEY

E. CAVERLY.
MEANS FOR CARRYING OUT BUSINESS SYSTEMS.
APPLICATION FILED JAN. 25, 1908.
1,056,500.
Patented Mar. 18, 1913.
2 SHEETS—SHEET 2.
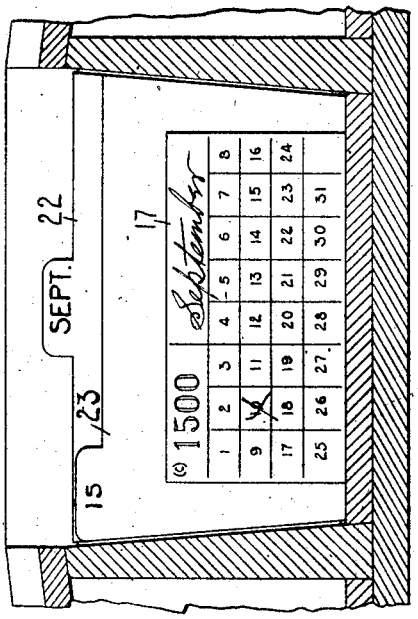
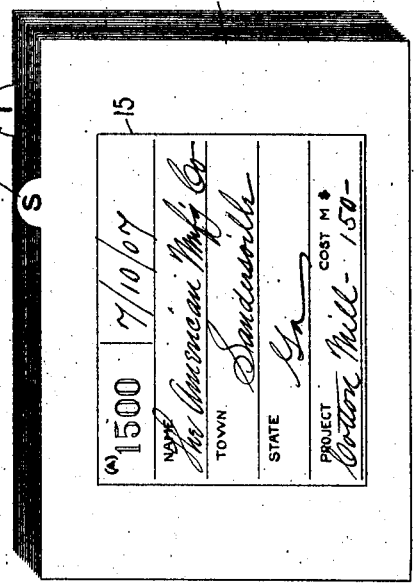
WITNESSES:
John Waldheim
E. M. Wells.
INVENTOR:
Edward Caverly
by Robert H. Strother
HIS ATTORNEY

UNITED STATES PATENT OFFICE.

EDWARD CAVERLY, OF NEW YORK, N. Y.

MEANS FOR CARRYING OUT BUSINESS SYSTEMS.

1,056,500.  Specification of Letters Patent. Patented Mar. 18, 1913.

Application filed January 25, 1908. Serial No. 412,599.

*To all whom it may concern:*

Be it known that I, EDWARD CAVERLY, a citizen of the United States, and resident of the borough of Manhattan, in the city, county, and State of New York, have invented certain new and useful Means for Carrying Out Business Systems, of which the following is a specification.

My invention relates to business systems, or to appliances for carrying out such systems, and it relates more particularly to what may properly be termed a coupon index system.

The principal object of my invention is to provide means for carrying out what is known in trade as a follow-up system, although the invention is also applicable, or may be adapted to other uses than the specific one hereinafter described.

To the above and other ends which will hereinafter appear, my invention consists in certain combinations and arrangements of forms and of devices to be used in connection therewith, all of which will be more fully set forth hereinafter and particularly pointed out in the claims.

One embodiment of my invention is illustrated in the accompanying drawings, in which—

Figure 1 represents a form or blank, said form or blank being shown as a leaf of a loose-leaf book. Fig. 2 is a conventional representation of a card index showing a coupon torn from the leaf represented in Fig. 1. Fig. 3 is a representation of a section of a daily reminder showing another of the coupons.

My invention comprises a series of forms such as that shown in Fig. 1 and designated generally by reference numeral 10. These forms are preferably bound in a book, and I prefer to make said forms or blanks as loose leaves and to bind them in a loose-leaf binder having a cover 11. This loose-leaf binder may be of any suitable sort, and the leaves or blanks may be secured therein in any suitable way. As shown, each leaf has perforations 12 through which project pins 13 which are secured to the covers 11. It will, of course, be understood that it is not absolutely essential that the blanks be bound in a book at all, and if they are bound in a book, that they may be permanently bound if preferred. Each of the blanks 10 comprises a stub 14 and three coupons 15, 16, 17, the coupons being readily separable from the stub and from one another by lines of perforations 18, represented in Fig. 1 by broken lines. The stub and each of the coupons bears a number or other distinguishing mark, each stub and its several coupons bearing the same number. The leaves or blanks are numbered consecutively throughout the book. The leaf shown in the drawing is number 1500, the one next beneath it would be 1501, and so on throughout the book. When the book is used up, it is contemplated that the numbers in the next book shall begin where the numbers in this book leave off. For example, if there are 250 leaves in a book, the book shown would contain numbers 1500 to 1749, inclusive, and the next book would begin with 1750.

The blank shown in the drawing is designed for the use of a company manufacturing plumbing fixtures. The operator in this particular instance, having access to trade journals, trade reports and other sources of information, is equipped with data as to prospective building projects, and, being thus informed, makes a record of interesting cases in the blanks provided for that purpose on the stub 14, of the leaves or blanks 10. The stub has, at the top, spaces for the State and town in which the building is to be erected, for the date when the first letter is sent to the owner or architect, for the approximate cost of the proposed building and for the character of the project, whether it be a residence or factory or hotel or jail, etc. This stub also contains spaces for the names of the owner, the architect and the plumber, and also a space in which is recorded the source from which the information was obtained. Immediately following these are two longitudinal spaces 250 and 260 extending across the stub 14, and these are marked respectively B. and C., the use of which will be explained hereinafter, Following the space marked C above referred to are four longitudinal parallel lines, and which being crossed by vertical lines, as shown, form a diagram consisting of three rows of squares or spaces, that as a whole are designated by the word "Key." The spaces between the two middle lines and following the word "Key" are identified certain letters of the alphabet, which operate as an index to the various forms of circular letters, as well as to the various catalogues or combinations of catalogues that are respectively used in the prosecution of the work in hand, as will be more fully explained hereinafter. The rows 251 and 261 of small blank spaces or squares in the section marked "Key" and immediately above, as well as below those spaces designated by certain letters, just referred to, are also designated by the letters B and C respectively, as shown in the stub 14. It will, therefore, appear that the various spaces employed and designated by each of the letters B and C, as shown in stub 14, operate in a dual capacity in their functions as indexes to the various moves that are made by the operator, but they are, as a matter of fact, coherent with, or an auxiliary to the reminder coupons B and C, and which are referred to in the accompanying drawing as 16 and 17 respectively, as will hereinafter be more fully set forth. Beneath this "key" diagram, there is a blank space reserved for remarks.

The detachable coupon 15 has blanks for the date, the name of the owner, the town and State, and the character of the project and its approximate cost. Each of the detachable coupons 16 and 17 is ruled somewhat like an ordinary calendar for a month, having a series of squares marked with the numerals 1 to 31 inclusive, and each of said coupons has at the top a blank, in which the name of the month may be written. These two coupons are alike, except that one of them is marked with the letter B and the other with the letter C, these letters corresponding and having reference respectively to the two sets of lines marked B and C on the stub, as will presently be explained. The coupon 15 may be appropriately referred to as the index coupon and the coupons 16 and 17 as reminder coupons. In this particular instance, however, the latter are in the form of date coupons, to be employed as reminders, as hereinafter set forth.

My system also comprises an index which, or part of which, is conventionally represented in Fig. 2. As here shown, this is an ordinary card index comprising plain cards 20, and tab cards 21. The plain cards 20 are reserved for the affixing of coupons 15, which are pasted on the face of the cards 20, thus forming the general index of the system. These contain no other data than that on the coupon, and are filed in cabinets or other receptacles, after the ordinary manner of card index systems.

My system also comprises a reminder to bring up, at stated periods or under certain conditions, matters that have been previously considered and set forward for future attention, as per data entered on the stubs, and indexed as above described. This reminder is conventionally represented in Fig. 3, and consists of a set of cards comprising tab cards 22, one for each month in the year, and two or more sets of tab cards 23, for the days of the month. This reminder may be in any one of a variety of forms, so changed or modified as to meet the specific requirements of any particular business adopting the system. In case letters are ordinarily written not over a month apart, two sets of day cards 23 might be sufficient; but, in some instances, more than two sets would be required. The card index may be contained in a set of drawers or boxes, as usual. I prefer to keep the daily reminder coupons in a small cabinet constructed for the purpose and kept on the operator's desk or table, and which are described in my application filed July 21, 1908, Serial No. 444,671.

The method of working or using this system is as follows: The company hereinbefore referred to, in its transactions pertaining to an organized publicity department, employs a series of circular letters, and these, being of various forms, are for convenience designated by certain letters of the alphabet, such as A, B, C, etc. There are also a series of catalogues which illustrate and describe fixtures, and which, either separately or in combination, are so classified as to cover specifications for different classes of buildings, and which, for convenience of identification as well as for manipulation, are also designated by certain letters of the alphabet, such as D, E, F, etc.; for example, there are catalogues of plumbing fixtures especially designed for use in factories, there are others for hospitals, and some for hotels, as well as for other buildings. There are also catalogues intended to be of interest to parties building residences, and so compiled as either separately or in combination to cover specifications for those of the most costly character, and then again there are others for medium or less pretentious dwellings.

When the operator of the system is informed of any project, he immediately makes a record of the details in the blanks in the stub 14, and he also transcribes a brief of the same to the blanks in the index coupon 15; he then communicates with the reported owner or architect by letter, and probably accompanies this with such a catalogue, or a combination of catalogues, as the character of the project will appear to justify. If, for example, in this first communication, circular letter B and catalogues, S and X are submitted, check marks would be placed as shown in the line marked "Key" in Fig. 1. Say this first letter is sent out July 10, 1907, at the same time the date August 15, 1907, or 8/15/07, would be recorded on the stub 14 in the upper space 250, marked B, indicating that, in the absence of a reply to said letter of July 10th, it should be followed by a second letter on August 15th, as recorded.

The "B" date coupon 16 would be marked for August 15th and would be placed in the daily reminder cabinet in front of the card 23, which represents that date in the same manner as the "C" coupon is shown in Fig. 3. Meanwhile, the coupon 15 is torn off, pasted on a card 20 and deposited in the index cabinet. There probably would be many of the date coupons to be attended to on the same day, depending of course on the volume of business that is being looked after. On August 15th all of the date coupons that stand in front of that card are removed from the reminder cabinet for attention. Each of these coupons carries the serial number of the specific case of record to which it relates, (as, for instance, 1500) and which guides the operator to its appropriate page in the loose-leaf book 11. This page instantly informs the operator as to the name and address of the party concerned, the character of the project, etc., and also the exact nature of the first communication sent to the owner or architect; it will also reveal at a glance what catalogues, or combination of catalogues, have been sent to said owner or architect. The operator then sends a second letter to his prospective customer, and perhaps accompanies this with other catalogues. For example, if the project is a residence to cost approximately $12,000, it may be that the catalogues sent July 10th illustrate and describe a line of more expensive fixtures than the owner wishes to install, and if the operator surmises this to be the reason he has received no reply to his first communication, he will now submit catalogues describing less expensive fixtures, and he will at the same time indicate by check mark in one of the little squares 251 following the lower letter B in stub 14 and immediately over that letter in the key to which the catalogue or combination of catalogues especially refers. When this second letter is sent, the date that it would properly come up again for attention, whether by reason of the continued silence of the owner or architect, or for any other reason, should be entered in the upper line 260 marked C, in the stub 14, noting that said date is fixed, say, for September 10th, and at the same time the date 10 in the "C" reminder coupon 17 would be checked, and said coupon would be placed in the reminder cabinet, to perform its functions as did coupon 16. If it is necessary to send the third communication, the character of such communication is recorded by check marks in the spaces 261 on the stub. In case two communications are sent in the same month, either of the coupons 16, 17 may be used twice, if desired. When these coupons have performed their functions, they are destroyed. Meanwhile, whenever a reply is received from any party to whom one of these letters has been addressed, the name of said party is looked up in the index cabinet, and, the serial number of that particular case being found, the operator is guided to the page of the book 10 where said case is recorded. The party having been heard from, it is of course desirable to note the fact on the record stub 14, as well as to remove the reminder coupon from the cabinet. The date, as 8—15—07, written in the line 250 or 260 of the stub, shows just where this coupon is to be found, without searching through the whole reminder cabinet, and so that it may readily be removed. This is important, as it would be a blunder to write another letter to this party, as if he had not previously been heard from.

In many cases in which favorable replies are received, the case is referred to the sales department, but in others the matter is pursued by correspondence, until an order is either won or lost, and the final result of the prospect is recorded in the space reserved for remarks in stub 14. In the particular business for which this specific form of my system is devised, it is not usually considered advisable to send more than three letters, and if no reply is received to the third letter the matter is abandoned.

When one of the books 10 has been filled up and all of the cases in it have been followed up to a successful or unsuccessful determination, the leaves of the book are transferred to some inexpensive sort of binding and are filed away. Each of the reminder coupons is destroyed after it has performed its function, but the general index to the system is preserved indefinitely, so in case that at any future time parties among those with whom correspondence has been held in the past should be found to be interested in other projects, the facts relating to the former would be revealed on its appropriate page stub 14, book 11, and possibly would be of service to the operator in his pursuit of the new project.

I also contemplate the use of a filing cabinet or drawer in which are folders bearing serial numbers corresponding to those on the stub and coupons of books 11. In these folders are kept the copies of letters written to the several parties and also any replies that may have been received from said parties. These folders will be arranged in a drawer or cabinet in numerical order, new folders being added from day to day at one end of the drawer and the folders of dead or otherwise terminated cases being removed from the other end of the drawer from time to time and filed away.

The equipment that the user of the system has to refer to in the course of his work at any given time, consists of one or two of the books 10, the small case or cabinet containing the daily reminder, the drawer containing the folders for the correspondence and the cabinet containing the alphabetical index. The drawer for the folders may be simply a deep drawer in a desk, and the daily reminder and one or two books take up hardly an appreciable amount of room on the desk; yet this very slight equipment enables one clerk to take care, with the utmost facility, of quite a large correspondence and to transact a large amount of business at a minimum expenditure of effort and of time.

Having thus described my invention, what I claim and desire to secure by Letters Patent is:

1. In appliances of the kind specified, the combination of a series of leaves or forms each having spaces designated for a record of the data of a project, said data including distinguishing matter capable of being indexed, a series of index forms having spaces suitably designated for indexing said indexable matter, a series of reminder forms each bearing designations referring to a future date, said leaves and said index and reminder forms being serially numbered and each of said index and reminder forms bearing the serial number of one of said leaves, and each of said leaves having spaces designated for recording the date on the corresponding reminder form and for recording the characters of former communications.

2. A form for use in a business system comprising a stub with blanks suitably designated for the data of a project, said data including distinguishing matter capable of being indexed, a detachable coupon having spaces suitably designated for indexing said indexable data recorded on the stub, and a detachable coupon, bearing reminder designations referring to a future date, said stub and its coupons being numbered alike and said stub having a space designated for recording the date on the reminder coupon, and said form also having spaces designated for recording the characters of former communications.

3. A book, the leaves of which are forms each comprising a stub with blanks suitably designated for the data of a project, said data including distinguishing matter capable of being indexed, and blanks designated for dates, a detachable coupon having spaces suitably designated for indexing said indexable data recorded on the corresponding stub, and a detachable coupon bearing reminder designations referring to a future date, each stub and its coupons being numbered alike and the stubs and coupons of successive leaves being numbered serially, and said stub having a space designated for recording the date on the reminder coupon, and said form also having spaces designated for recording the characters of former communications.

4. A form for use in a business system comprising a stub with blanks suitably designated for recording the name and address of an individual, a firm, a corporation, an institution or a municipality and other data germane to a project, a detachable coupon having spaces suitably designated for indexing the name and address or other indexable data recorded on said stub, and one or more detachable coupons bearing reminder designations for recording future dates; said stub having spaces designated for recording the date or dates entered on the reminder coupon and also having spaces and symbols for registering in abbreviated form any action relating to the project under consideration; said stub and its coupons being numbered alike.

Signed at New York, in the county of New York and State of New York, this 21st day of January, A. D. 1908.

EDWARD CAVERLY.

Witnesses:
C. A. PECK,
H. C. REUTER.